United States Patent
Chen

(10) Patent No.: US 7,075,787 B2
(45) Date of Patent: Jul. 11, 2006

(54) HEAT DISSIPATING STRUCTURE FOR COMPUTER CASING

(75) Inventor: Yin-Hung Chen, Taipei (TW)

(73) Assignee: Shuttle Inc., Taipei (TW)

( * ) Notice: Subject to any disclaimer, the term of this patent is extended or adjusted under 35 U.S.C. 154(b) by 0 days.

(21) Appl. No.: 10/828,274

(22) Filed: Apr. 21, 2004

(65) Prior Publication Data

US 2005/0237710 A1 Oct. 27, 2005

(51) Int. Cl.
*G06F 1/20* (2006.01)
*H05K 7/20* (2006.01)

(52) U.S. Cl. ........................ 361/687; 361/695; 174/16.1

(58) Field of Classification Search ........ 361/679–687, 361/724–727, 695, 736, 753; 174/16.1, 15.2; 165/121, 104.14; 312/223.2
See application file for complete search history.

(56) References Cited

U.S. PATENT DOCUMENTS 6,525,936 B1 * 2/2003 Beitelmal et al. ........... 361/695
6,654,251 B1 * 11/2003 Yun ........................... 361/724
6,771,499 B1 * 8/2004 Crippen et al. ............. 361/687
2005/0030714 A1 * 2/2005 Wu ............................ 361/695

* cited by examiner

*Primary Examiner*—Hung Van Duong

(57) ABSTRACT

A heat dissipating structure for a computer casing includes a computer casing having a front board, a back board, and a bottom board, wherein the front board and the back board are parallel and correspond to each other by being connected together on the bottom board. There are two supporting frames mounted at an opposite side corresponding to the bottom board for respectively connecting with the upper sides of the front board and the back board so as to form a rectangular hexahedron. There are plural placing slots mounted on the front board for placing a disk drive, a CD-ROM drive, and plural connectors therein, wherein the front board further has the plural heat dissipating openings mounted thereon between the positions of the placing slots. Through the heat dissipating openings, the air flowing outside is drawn into the inside computer casing so that the heat generated by the electrical elements can be exhausted to the outside and a better heat dissipating effectiveness is achieved.

6 Claims, 5 Drawing Sheets

US 7,075,787 B2

HEAT DISSIPATING STRUCTURE FOR COMPUTER CASING

BACKGROUND OF THE INVENTION

The present invention is related to a heat dissipating structure, and more particularly, to a heat dissipating structure for a computer casing, which is able to increase the circulation of the air flowing inside the computer casing so that the heat generated by the electrical elements at the front board and inside the computer casing can be rapidly dissipated. Accordingly, a better heat dissipating effectiveness is achieved. With the fast and flourishing developments in the industry of information technology, the designs relevant to the computer field focuses on small, thinness, and lightness. Especially when the computer host machine is miniaturized, the working room for the user has become more spacious and comfortable. However, because the outside appearance and the volume of the computer host machine is significantly miniaturized and also the computer system is heading to the developing trend of high working speed and high frequency, the heat generated from the inside computer casing is prominently increased. Therefore, how to provide a computer casing with a superior heat dissipating efficiency has become a major problem waited to be solved by the research workers in the industry.

The structure of the conventional computer casing is shown in FIG. 1. The casing mainly includes the front board 11a, the back board 12a, the bottom board 13a, and a pair of supporting frames 14a. The front board 11a and the back board 12a are parallel to each other and correspond to each other by being connected together on the bottom board 13a. There are two supporting frames 14a mounted at an opposite side corresponding to the bottom board 13a. The two supporting frames 14a are respectively connected with the upper sides of the front board 11a and the back board 12a so as to form a rectangular hexahedron 10a. There is the grating-shaped opening 121a mounted on the upper portion of the back board 12a. At the middle portion of the back board 12a are the plural openings 122a. There are all kinds of electrical elements with different functions inside the computer casing, such as the disk drive, the CD-ROM drive, the power supply, and etc. The heat dissipating fan for the power supply is mounted at the grating-shaped opening 121a of the back board 12a. Through the air flowing driven by the operation of the heat dissipating fan, the cold air is drawn into the computer casing from the plural openings 122a on the rectangular hexahedron 10a, and then, exhausted from the grating-shaped opening 121a on the back board 12a. Accordingly, the heat dissipating for the electrical elements inside the computer host machine is achieved.

However, the heat dissipating structure for the conventional computer casing still has the following problems in the practical implement:

Firstly, since both the grating-shaped opening 121a and the plural openings 122a are at the back board 12a, the circulation path of the air flowing is limited for the electrical elements at the back area of the computer casing. That is, the heat generated by the electrical elements at the front and middle areas of the computer casing can not be exhausted to the outside through the former circulation of the air flowing.

Secondly, the left side and right side of the rectangular hexahedron 10a is an opened space. The conventional heat dissipating structure for the computer casing has the plural openings opened on the side boards (not shown) for assisting the heat dissipating. Nevertheless, since there are many elements like memory modules, display card, and sound card inside the computer casing, or because the ambient environment where the computer host machine is located is limited (i.e. the lateral side of the casing is against the wall), the circulation of the air flowing through the openings has a certain limitation.

Hence, in order to overcome the drawbacks in the prior art, a heat dissipating structure for a computer casing capable of providing a superior air circulation, is provided.

SUMMARY OF THE INVENTION

The present invention is to provide a heat dissipating structure for a computer casing. Through the heat dissipating openings mounted on the front board, the air flowing outside the rectangular hexahedron is drawn into the inside computer casing so that the heat generated by the electrical elements at the front and middle areas of the computer casing can be exhausted to the outside. Therefore, the moving energy of the air flowing inside the computer casing is enhanced and a better heat dissipating effectiveness is achieved.

In order to achieve the above purpose, the heat dissipating structure for a computer casing is provided in the present invention. The computer casing has a front board, a back board, and a bottom board, wherein the front board and the back board are parallel to each other and correspond to each other by being connected together on the bottom board. There are two supporting frames mounted at an opposite side corresponding to the bottom board for respectively connecting with the upper sides of the front board and the back board so as to form a rectangular hexahedron. Further, there are plural placing slots mounted on the front board for placing a disk drive, a CD-ROM drive, and plural connectors therein, wherein the front board further has the plural heat dissipating openings mounted thereon between the positions of the placing slots.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
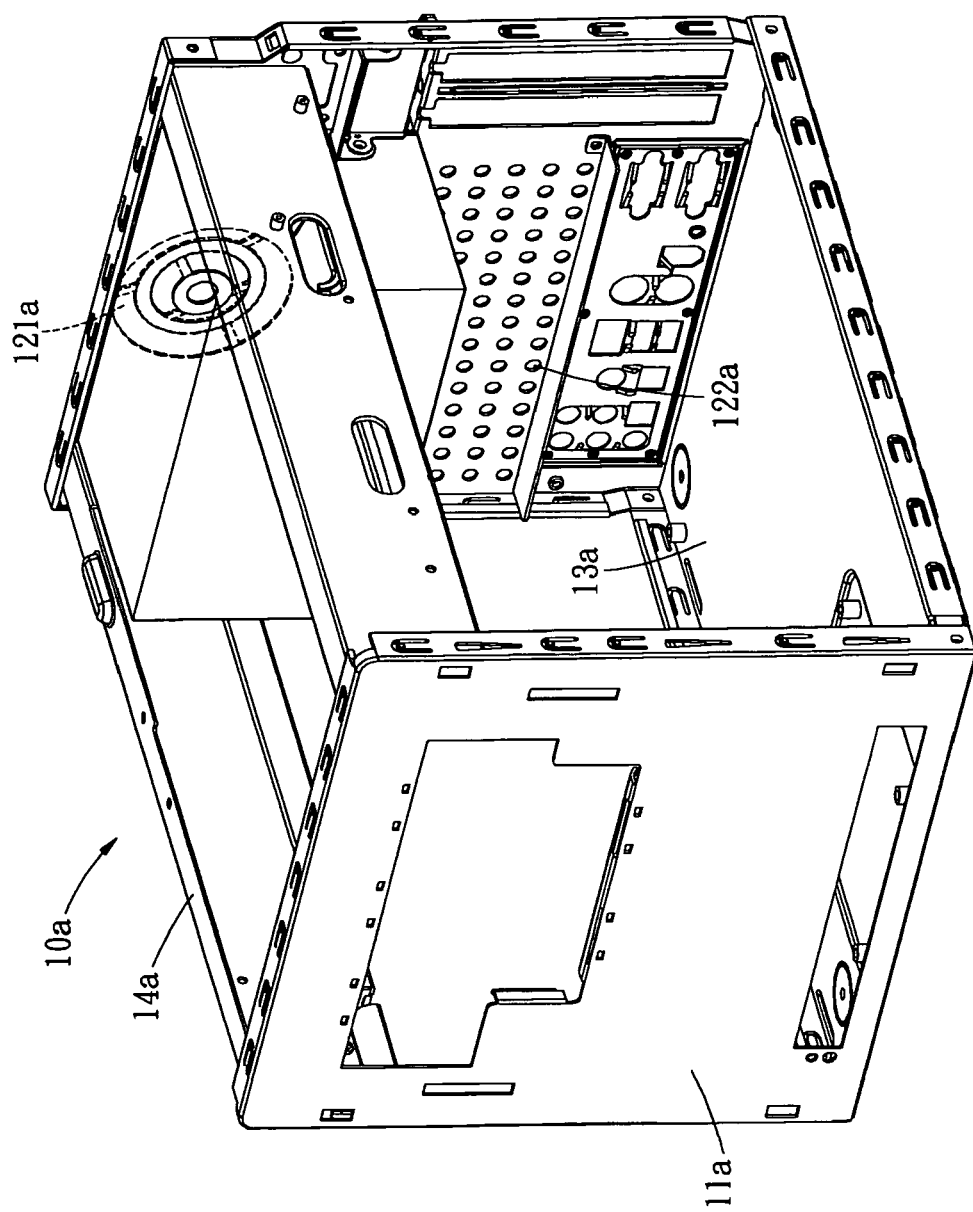
FIG. 1 is a diagram showing the rectangular body of the computer casing according to the prior art.
Figure 2:
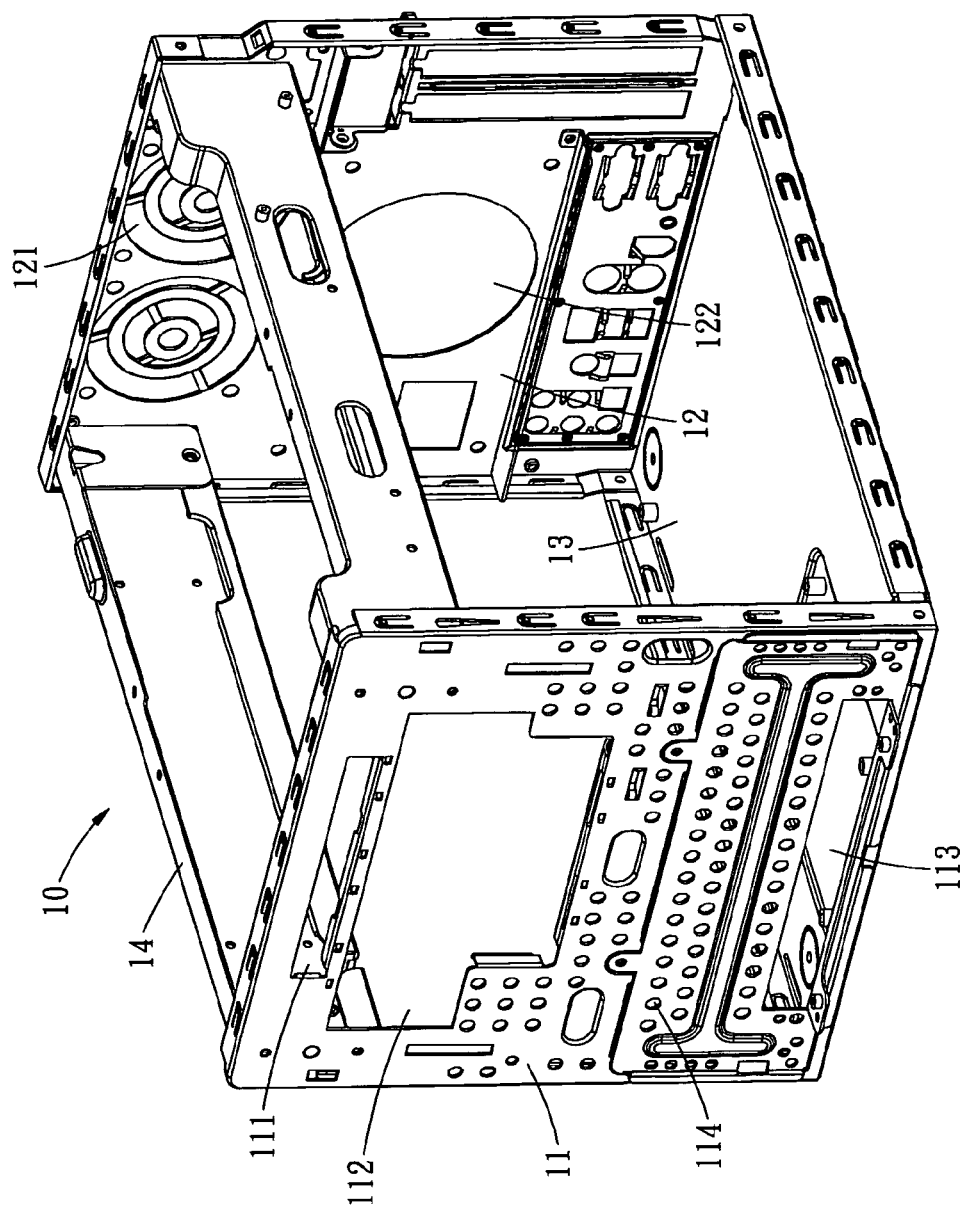
FIG. 2 is a diagram showing the rectangular body of the computer casing according to a preferred embodiment of the present invention.

Please refer to FIG. 2 which shows the rectangular body of the computer casing according to a preferred embodiment of the present invention. The heat dissipating structure for a computer casing is provided in the present invention. The computer casing has the front board 11, the back board 12, the bottom board 13 and a pair of supporting frames 14. The front board 11 and the back board 12 are parallel to each other and correspond to each other by being connected together on the bottom board 13. There are two supporting frames 14 mounted at an opposite side corresponding to the bottom board 13. The two supporting frames 14 are respectively connected with the upper sides of the front board 11a and the back board 12 so as to form a rectangular hexahedron 10. The front board 11 is formed by the metal flat embossing. Further, there are the first placing slot 111, the second placing slot 112, and the third placing slot 113 mounted on the front board 11. The first placing slot 111 is for placing the connector of the memory card therein; the second placing 112 is for placing the disk drive or the CD-ROM drive therein; the third placing slot 113 is for placing the connectors with different functions therein. On the front board 11, there are plural heat dissipating openings 114 mounted among the interval positions of the first placing slot 111, the second placing slot 112, and the third placing slot 113. The plural heat dissipating openings 114 can be round, rectangular, or polygonal heat dissipating openings. In this embodiment, the heat dissipating openings 114 have round shapes. Further, the back board 12 is formed by the metal flat embossing. There are two grating-shaped openings 121 mounted on the upper portion of the back board 12 and corresponding to each other. At the middle portion of the back board 12 are the plural round openings 122.

Figure 3:
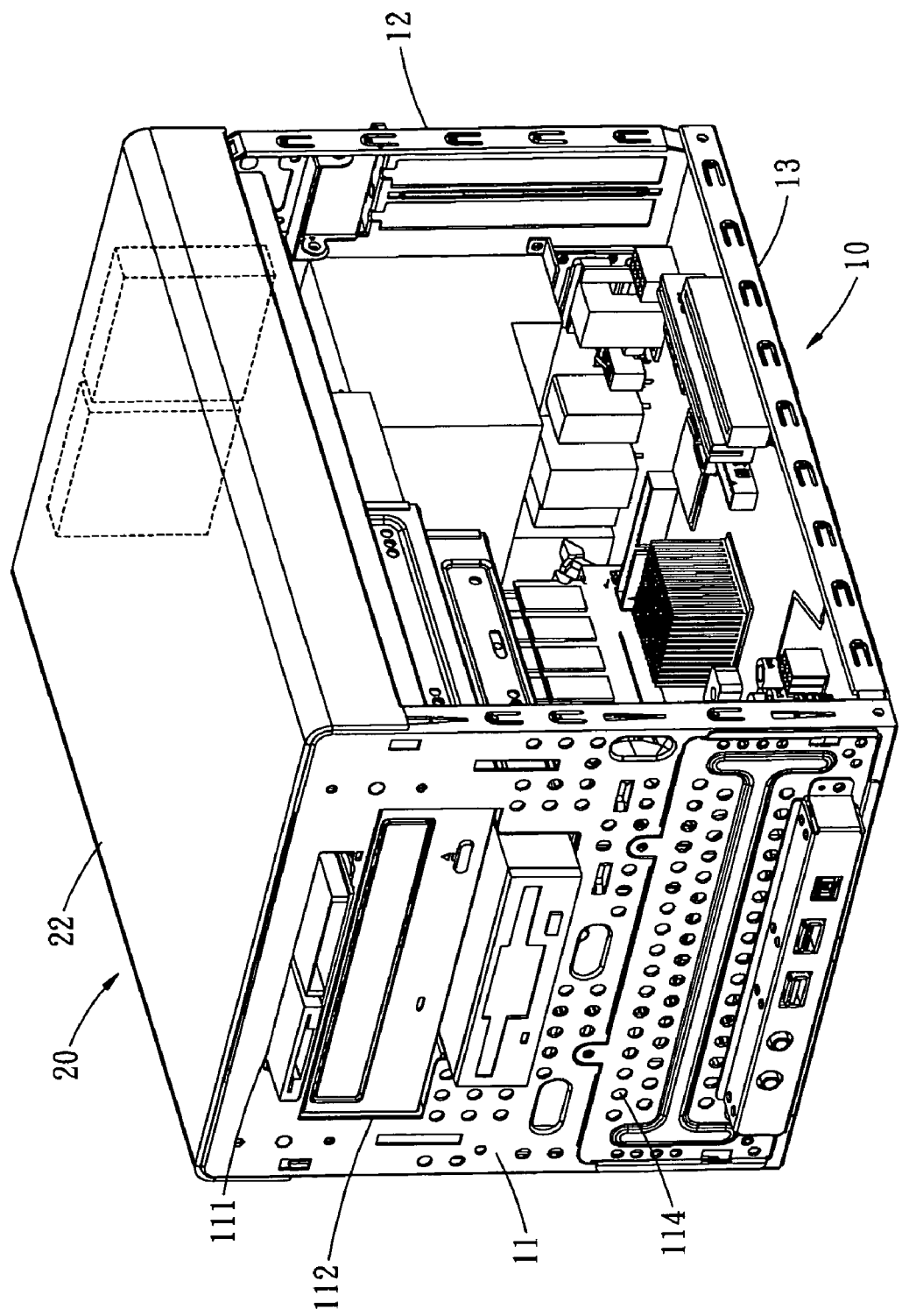
FIG. 3 is a diagram showing the assembling structure of the computer casing according to a preferred embodiment of the present invention.

Please refer to FIG. 3 which shows the assembling structure of the computer casing according to a preferred embodiment of the present invention. The first placing slot 111 on the front board 11 has a connector for the memory card placed therein; the second placing slot 112 has the disk drive or the CD-ROM drive placed therein; the third placing slot 113 has the connectors with different functions placed therein. Further, a computer mother board is fixedly mounted on the bottom board 13. The electrical elements with different functions such as CPU module, memory module, sound card, and display card are mounted on the mother board. In addition, there are two heat dissipating fans (the dotted line) fixedly mounted behind the grating-shaped openings 121 on the back board 12. Under the two grating-shaped openings 121 is a power supply. The heat dissipating fan for the power supply is positioned behind the openings 122 on the back board 12. Accordingly, the inside structure of the computer casing is formed.

Figure 4:
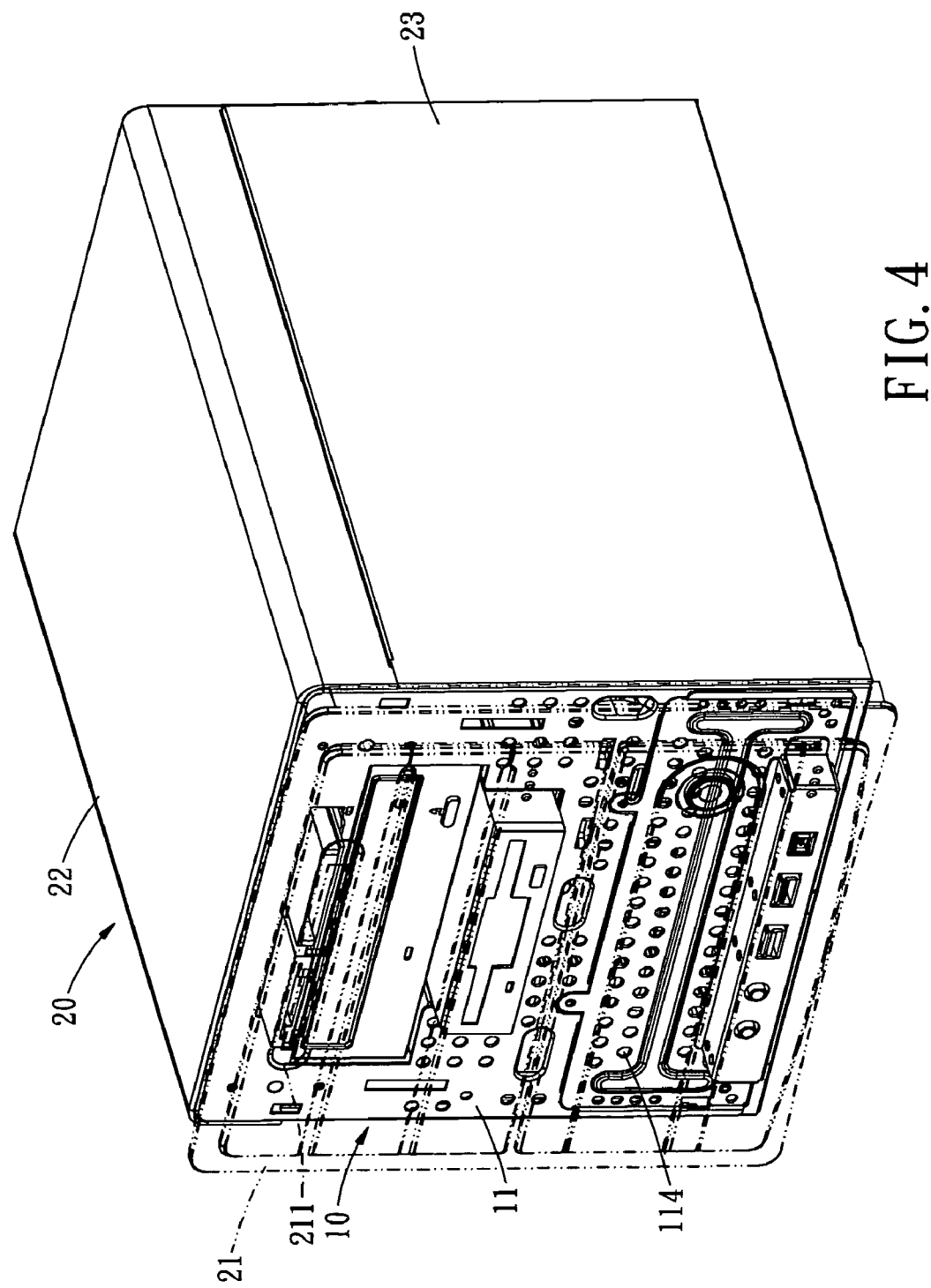
FIG. 4 is a diagram showing the structure of rectangular body assembled with the housing according to a preferred embodiment of the present invention.
Figure 5:
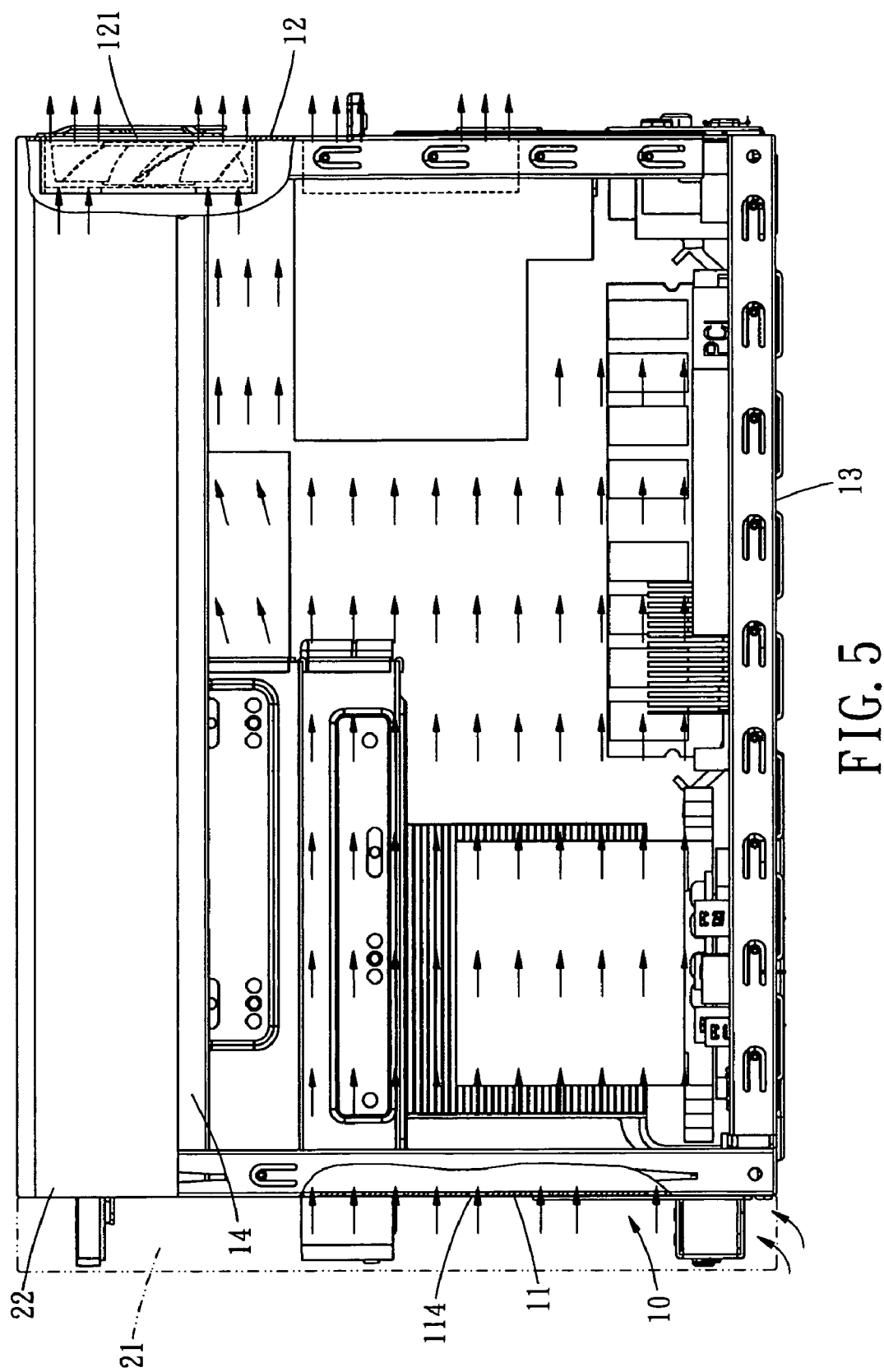
FIG. 5 is a sectional view showing the air flowing inside the computer casing according to a preferred embodiment of the present invention.

Please refer to FIGS. 4–5 which respectively show the structure of rectangular body assembled with the housing and the air flowing inside the computer casing. The computer casing further includes the housing 20 for covering the rectangular hexahedron 10. The housing 20 includes the front panel 21, the π-shaped top board 22, the left and right side boards 23. The front panel 21 is positioned on the surface of the front board 11 and is made of porosity material. And, the front panel 21 has the slot opening 211 corresponding to the positions of the placing slots 111, 112, and 113. The top board 22 covers on the top of the front board 11, the back board 12, and the supporting frames 14. The top board 22 is connected and engaged with the two supporting frames 14. In addition, the left and right side boards 23 are mounted on the surfaces formed by the front board 11, the back board 12, the bottom board 13 and the supporting frames 14. When the heat dissipating fan on the back board 12 operates, the air flowing flows through the heat dissipating openings 114 on the front board 11 by passing through the vacant spaces between the slot opening 211 on the front board 11 and the respective placing slots 111, 112, and 113, or by passing through the joint seams between the front panel 21 and the respective side boards and top board 22. Therefore, the heat generated by the electrical elements at the front and middle areas of the computer casing can be exhausted to the outside and the whole heat dissipating efficiency is accordingly raised.

According to the above, the heat dissipating structure for a computer casing provided in the present invention at least has the following advantages. First, since there are plural heat dissipating openings opened on the front board and the heat dissipating openings are at the positions parallel and corresponding to the heat dissipating fan, the air flowing can be drawn into the inside computer casing efficiently so that the heat generated by the electrical elements at the front and middle areas of the computer casing can be exhausted to the outside. Further, the heat dissipating openings are opened on the front board, so the air flowing will not be blocked by the memory module, the display card or the sound card. Accordingly the limitation raised by the ambient environment where the computer host machine is located is effectively solved. In addition, the front panel 21 is made of porosity material, which has the property of allowing the ventilation. Therefore, the cold air from the outside can flow inside the computer casing smoothly and a superior heat dissipating effectiveness can be achieved. Hence, the present invention not only has a novelty and a progressive nature, but also has an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A heat dissipating structure for a computer casing having a front board, a back board, and a bottom board, wherein said front board and back board are parallel and correspond to each other by being connected together on said bottom board, comprising:

two supporting frames mounted at an opposite side corresponding to said bottom board for respectively connecting with upper sides of said front board and said back board so as to form a rectangular hexahedron; and plural placing slots mounted on said front board for placing a disk drive, a CD-ROM drive, and plural connectors therein, wherein said front board further has plural heat dissipating openings mounted thereon between positions of said placing slots, wherein said back board has openings and a heat dissipating fan mounted thereon, said openings are at positions corresponding to said heat dissipating fan and parallel to said heat dissipating openings of said front board so as to help the air flowing inside said computer casing.

2. The heat dissipating structure for a computer casing according to claim 1, wherein said plural heat dissipating openings are round heat dissipating openings.

3. The heat dissipating structure for a computer casing according to claim 1, wherein said plural heat dissipating openings are polygonal heat dissipating openings.

4. The heat dissipating structure for a computer casing according to claim 1 further comprising a housing for covering said rectangular hexahedron.

5. The heat dissipating structure for a computer casing according to claim 1, wherein said housing comprises a front panel, a top board and side boards, and wherein said front panel is mounted on said front board, said top board is mounted on a top of said front board, said back board, and said supporting frames and engaged with said supporting frames, and said side boards are mounted on surfaces formed by said front board, said back board, said bottom board and said supporting frames.

6. The heat dissipating structure for a computer casing according to claim 1, wherein said front panel of said housing is made of porosity material.

\* \* \* \* \*